Aug. 1, 1944.　　　　W. M. HUSTON　　　　2,354,863
LOAD HANDLING EQUIPMENT
Filed July 29, 1942　　　4 Sheets-Sheet 1

INVENTOR:
William M. Huston
BY
Sylvester & Lechner
ATTORNEYS.

Aug. 1, 1944.　　　W. M. HUSTON　　　2,354,863
LOAD HANDLING EQUIPMENT
Filed July 29, 1942　　　4 Sheets-Sheet 2

Aug. 1, 1944.　　W. M. HUSTON　　2,354,863
LOAD HANDLING EQUIPMENT
Filed July 29, 1942　　4 Sheets-Sheet 3

INVENTOR:
William M. Huston
BY
ATTORNEYS.

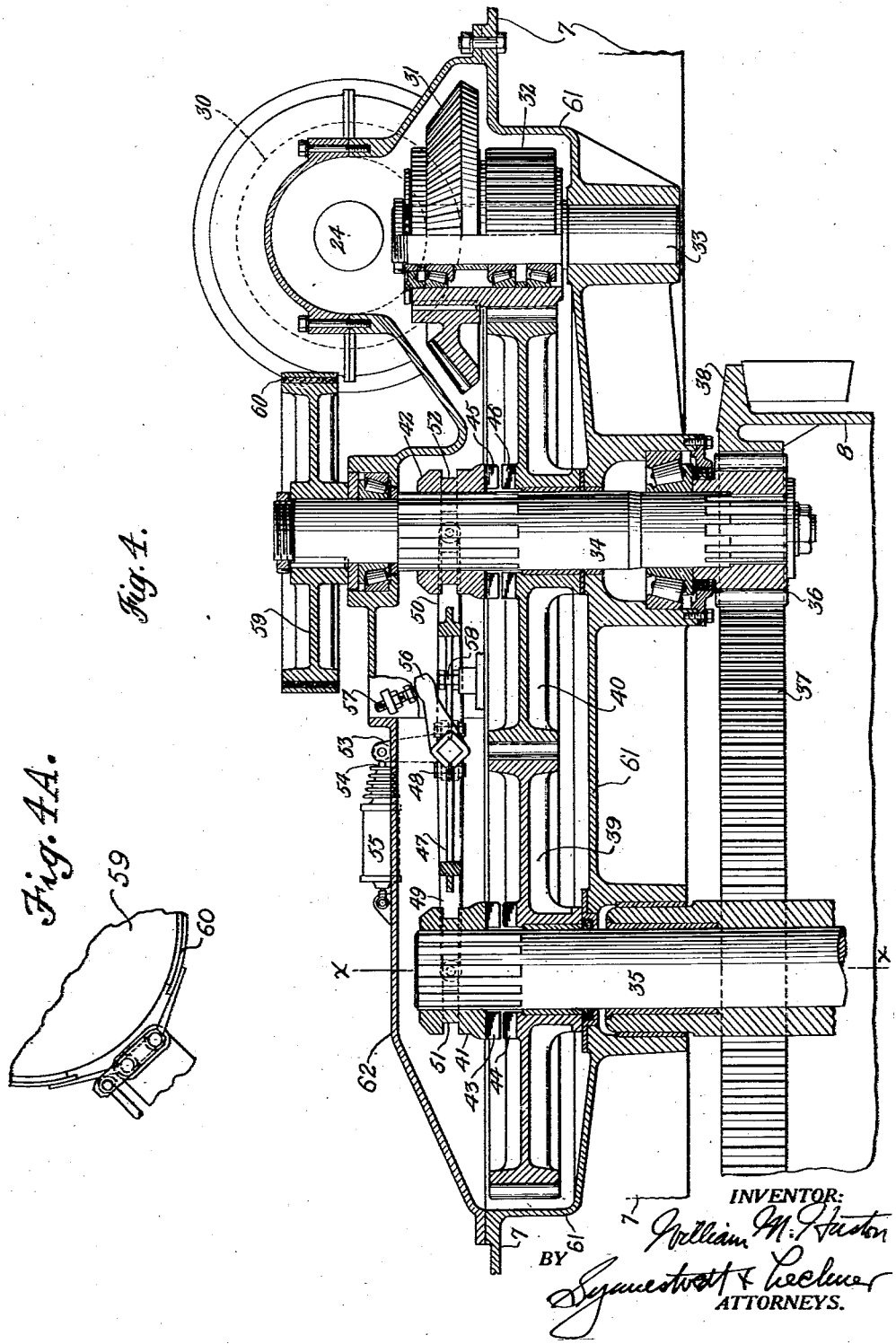

Patented Aug. 1, 1944

2,354,863

UNITED STATES PATENT OFFICE 2,354,863

LOAD HANDLING EQUIPMENT

William M. Huston, Lima, Ohio

Application July 29, 1942, Serial No. 452,746

5 Claims. (Cl. 212—38)

This invention relates to load handling equipment of the type having a rotating base mounted on a crawler truck.

In machines of the type referred to, for instance, power shovels, draglines or excavators, the rotating base carries a power plant or engine and the major portion of the machinery for carrying on the operations for which the machine is designed. Ordinarily, reversible power transmission means are provided for rotating the base on the crawler truck (commonly referred to as the swing motion); and, in addition, reversible power transmission means are customarily provided for actuating the crawler so as to propel the machine in either direction on the ground.

The present invention is particularly concerned with the reversible power transmission means for effecting swing motion of the rotating base as well as for propelling the machine on the ground.

An important object of the invention lies in the arrangement of the power transmission means for the functions just mentioned, so that at least a portion of such power transmission means is common to both of such functions. Moreover, according to the invention, a single reversing mechanism is employed for both the swing and propel functions. In the way, the number of mechanical parts required to perform these functions is reduced, it being of especial importance that the number of gears is reduced, particularly bevel gears, the manner in which this is accomplished being pointed out more fully hereinafter.

Beyond the foregoing, the invention also has in view location of various of the power transmission parts on the rotating base well to the rear of the vertical axis of swing motion, thereby utilizing a greater proportion of the live weight of the machinery for counterbalancing purposes.

A further object of the invention is the arrangement of certain controllable friction clutches incorporated in the drive means for swing and propel in such manner that said clutches are more readily accessible for adjustment, relining, etc., than has been practicable heretofore.

How the foregoing and other objects and advantages are attained will appear more fully from the following description referring to the accompanying drawings, which illustrate application of the invention to a power shovel, and in which—

Figure 4 is an enlarged vertical sectional fragmentary view of certain of the driving parts for swing and propel mounted on the rotating base close to the crawler truck; and Fig. 4A is a fragmentary plan view illustrating the means for operating the swing brake of Figure 4.

Figure 1:
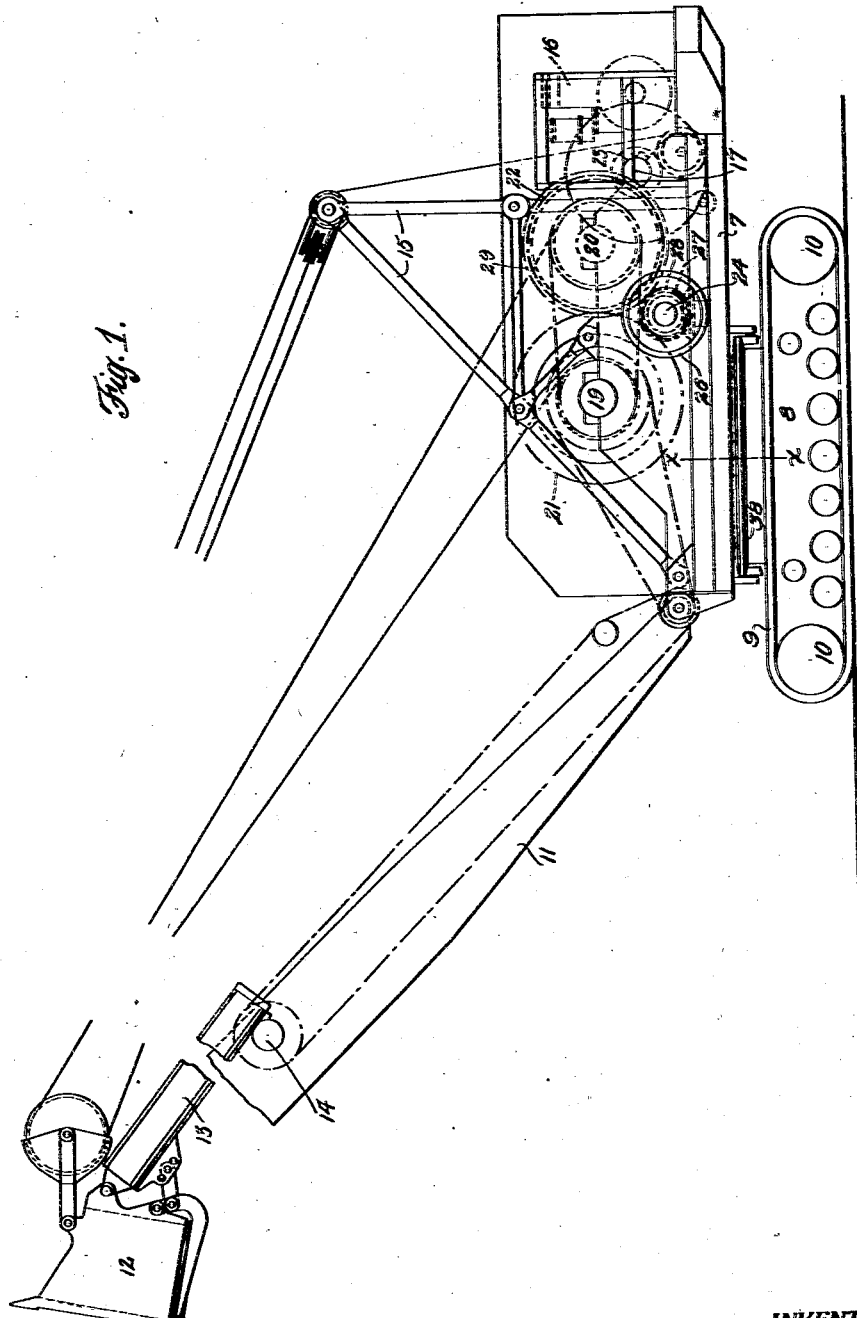
Figure 1 is a side elevational view of a power shovel, certain parts being shown only in outline for the sake of simplicity, and a substantial portion of the boom and dipper stick being broken out for the sake of compactness.
Figure 2:
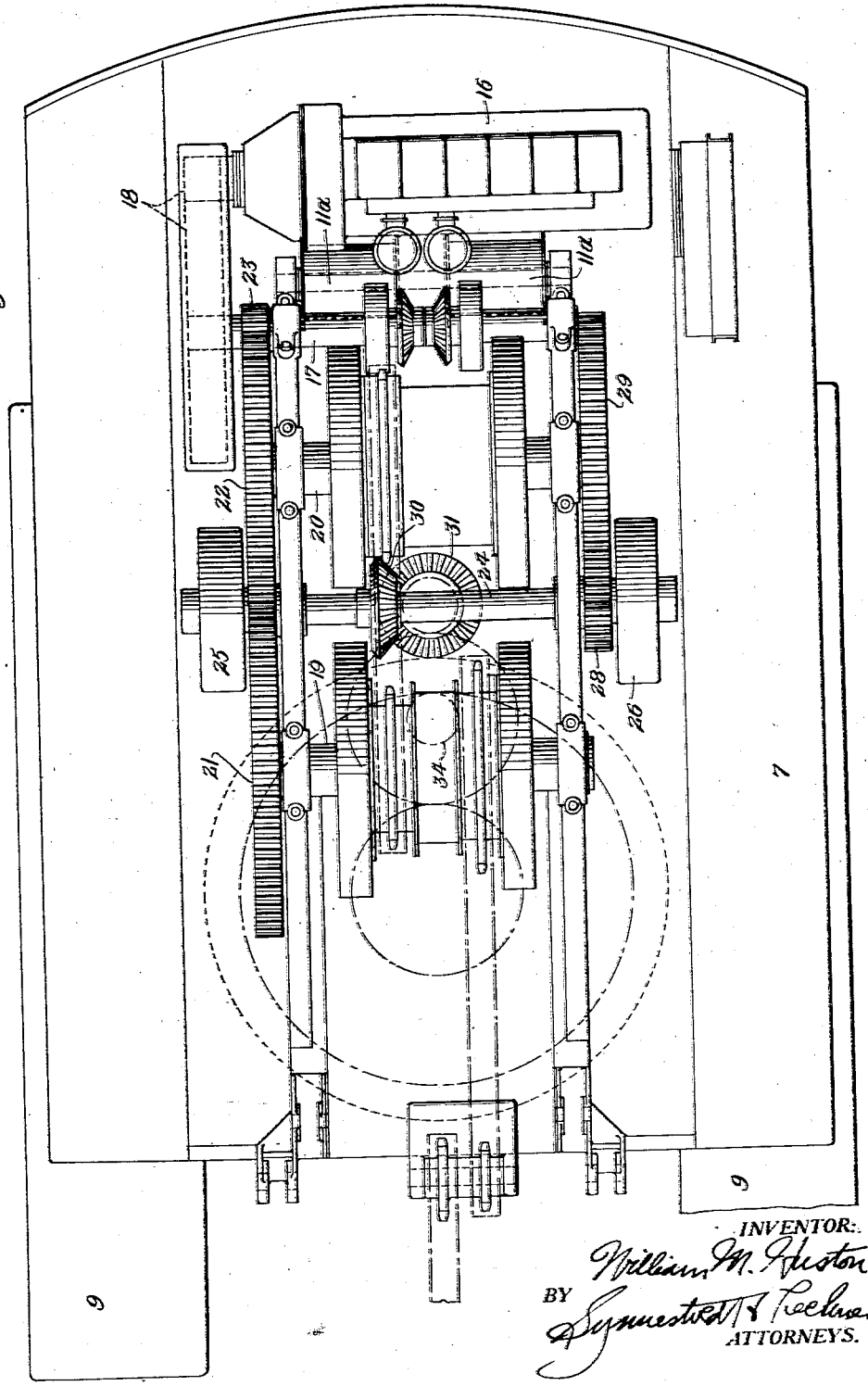
Figure 2 is a top view of the rotating base and various parts of the machinery carried thereby.
Figure 3:
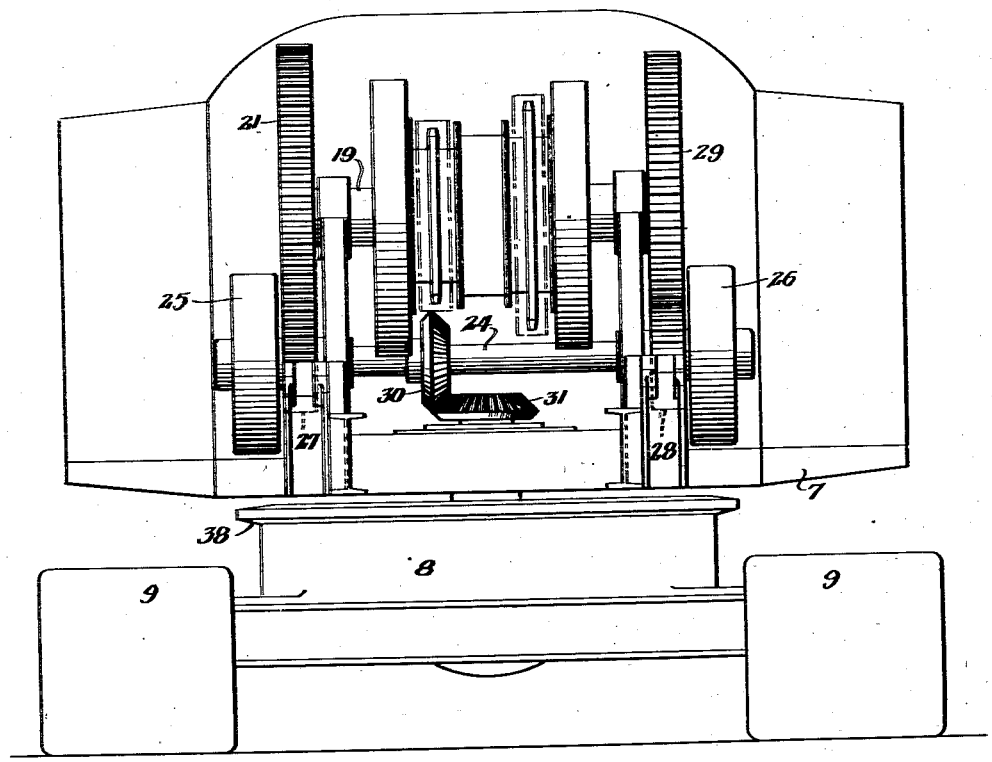
Figure 3 is an elevational view looking rearward from the front of the machinery mounted on the rotating base.

In the drawings, the rotating base is indicated by the numeral 7, this base being mounted on the crawler truck for swing motion about the vertical axis x—x. The crawler truck is indicated generally by the numeral 8, this truck having a pair of crawler treads 9—9 carried by sprockets indicated diagrammatically at 10—10, at least one of the sprockets being adapted to be driven through power transmission means later to be described.

The boom 11 is pivotally connected with the rotating base at the forward end thereof and serves to carry the dipper 12 through the medium of the dipper stick 13, which may be associated with the usual shipper shaft diagrammatically indicated at 14. Appropriate cables and sheaves are provided for control of the boom and dipper, but these parts need not be considered in detail since they form no part of the present invention per se. It may be noted, however, that the boom hoist cables are associated with a gantry 15 rigidly connected with the base 7, the cables being coupled with one or more boom hoist drums 11a mounted on the rotating base in a manner which need not be discussed herein.

The power plant for operation of the machine comprises an engine 16 preferably located toward the rear of the rotating base. Power from the engine is transmitted to the jack shaft 17 through herringbone gearing enclosed at 18. This shaft also carries the usual gearing for operating the boom hoist drums. The front and rear drum shafts 19 and 20 are provided with intermeshing gears 21 and 22, the latter of which meshes with pinion 23 mounted at one end of the jack shaft 17. The drum shafts 19 and 20 are employed to carry any desired arrangement of cable drums and power clutches and brakes for performing the functions for which the machine is des'gned, for instance, in a power shovel, for performing the functions of dipper hoist, crowding, etc. These and other functions and the mechanisms for performing them need not be described in detail herein.

Attention is now called to the fact that a transverse horizontal shaft 24 is arranged intermediate and below the plane of the drum shafts 19 and 20. Clutches 25 and 26 are arranged at opposite ends of shaft 24.

At one side the housing of clutch 25 is connected with a pinion 27 meshing with drum shaft gear 21. The clutch spider at this side is keyed to shaft 24 and, therefore, engagement of the clutch serves to transmit power from gear 21 through pinion 27 to shaft 24.

At the other end of shaft 24, the drum of clutch 26 is connected with a pinion 28 which meshes with a gear 29, which latter is keyed to the rear drum shaft 20. The spider of clutch 26 is keyed to shaft 24, so that engagement of this clutch serves to transmit power from gear 29 through pinion 28 to shaft 24.

It will be observed that the direction of rotation of shaft 24 provided by engagement of the clutches 25 and 26 is in opposite senses.

A pair of bevel gears 30 and 31 serves to interconnect shaft 24 with a pinion 32, which is rotatively mounted on the vertical reverse shaft 33 (see Figure 4), the power being transmitted from pinion 32 to the swing and propel shafts, as now described.

The swing shaft is indicated at 34 and the propel shaft at 35, the latter being arranged coaxially with the axis of swing motion $x$—$x$ in the general manner now understood in this art. At its lower end shaft 35 is coupled through appropriate gearing and the like with the sprockets for driving the crawler treads, this mechanism not being illustrated herein since it forms no part of the present invention per se.

Swing shaft 34 carries a pinion 36 meshing with teeth forming an internal gear 37 just inside of the roller path 38, which is located just above the crawler truck.

A pair of intermeshing gears 39 and 40 is journaled, respectively, on propel and swing shafts 35 and 34, the latter of these gears (40) also meshing with pinion 32 above mentioned.

Gears 39 and 40 may, respectively, be coupled with shafts 35 and 34 by means of dog type clutch devices 41 and 42. Clutch 41 is splined for vertical sliding movement on shaft 35 and is provided with teeth 43 adapted to engage complementary teeth 44 formed at the hub of gear 39. Similarly, clutch 42 is splined on shaft 34 and is provided with teeth 45 adapted to cooperate with complementary teeth 46 formed on gear 40.

Actuation of one or the other of clutches 41 and 42 will serve to transmit power from shaft 24 either to the propel shaft 35 or to the swing shaft 34. According to a further feature of the invention control means are provided for actuating clutches 41 and 42 alternatively, the control means desirably providing interrelated operation such that one clutch is disengaged when the other is engaged. For this purpose I prefer to employ a walking beam 47 mounted on shaft 48, both ends of the beam being forked, as at 49 and 50, fork prongs 49 being extended to engage an annular groove 51 formed on clutch 41 and prongs 50 being extended to engage a similar groove 52 on clutch 42. Oscillation of the beam, therefore, simultaneously engages one clutch and disengages the other.

The beam 47 may be actuated through shaft 48 by means of an arm 53 which is connected with piston stem 54 projecting from the double-acting fluid pressure actuating cylinder 55. Any suitable source of fluid under pressure, such as compressed air, may be employed in cylinder 55, and it will be understood that appropriate control valves and the like will be placed at the operator's position so as to actuate piston stem 54 in either direction and, therefore, provide for selection of clutch engagement as between clutches 41 and 42.

Another arm 56, projecting from shaft 48, may serve as an abutment for limiting the degree of engagement of either of the clutches, adjustable abutment screws 57 and 58 being located to cooperate with lever 56.

A brake for retarding swing motion is preferably associated with the upper end of swing shaft 34, this brake being illustrated at 59 and having an external cylindrical surface adapted to cooperate with a contracting brake band 60. The brake band may be actuated in any suitable manner, as for instance by means of a fluid pressure piston and cylinder device, a suitable control valve again being placed at the operator's position.

Lubrication of various parts, and especially of certain of the gears for swing and propel, is effectively provided for by an oil sump defined by wall elements such as indicated at 61, which is closed by the cover plate 62. In the preferred construction the sump lies at least in part within the rotating base, for the sake of compactness, and the sump-defining walls 61 desirably constitute structural parts of the rotating base itself. Lubrication of various parts not positioned to pick up oil directly from the sump is preferably effected by means of a pump housed therein and driven by one of the moving parts therein. Other parts, such as shaft bearings, may of course be separately lubricated by known types of fittings.

From the foregoing it will be seen that power for effecting the functions of swing and propel is derived from shaft 24 which is adapted to be selectively driven in either direction (by engagement of clutch 25 or clutch 26). A single reversing mechanism, therefore, serves for reverse operation of both of the swing and propel functions.

It is also of particular importance that the drive from shaft 24 is carried downwardly to the crawler truck through only a single pair of bevel gears.

Various other parts of the mechanism are also simplified, it being noted that clutches 25 and 26 serve for both of the functions just mentioned; and with respect to these clutches it is further observed that the arrangement thereof outside of the planes of gears 21—22 at one side of the machine, and gear 29 at the other, brings the clutches into highly advantageous positions from the standpoint of adjustment, relining or repair.

Location of shaft 24 well to the rear of the vertical axis of swing motion aids in maintaining a large proportion of the machinery in a position where it is effective for counterbalancing purposes.

The general arrangement of various of the parts not only reduces the required number of gears, etc., but it is also rugged and reliable. Moreover, the disposition of clutches 41 and 42, as described, makes for compactness, which is an important consideration in view of the limited space available in the general region where these parts are located.

Mounting of the swing brake directly on the swing shaft is also of advantage from the standpoint of compactness. This brake, being connected with the swing shaft, further operates more directly than where the brake is associated with one of the horizontal shafts mounted on the rotating base.

I claim:

1. In a load handling machine having a rotating base mounted on a crawler truck and further having a power plant mounted on the rotating base, drive mechanism for swing and propel including a horizontal shaft mounted on the rotating base, a gear fixed to said horizontal shaft, a generally upright reverse shaft having a gear fixed thereto in constant mesh with said first gear, a disconnectible power transmission between the power plant and said horizontal shaft including a controllable clutch mounted on one end of said shaft for rotating the shaft in one direction, a second disconnectible transmission between the power plant and said horizontal shaft including a controllable clutch mounted on the other end of said shaft for rotating the shaft in the opposite direction, a swing shaft, a propel shaft, and drive transmission parts for alternatively coupling said reverse shaft with either one of the swing and propel shafts.

2. In a load handling machine having a rotating base mounted on a crawler truck, power transmission mechanism for delivering power to the truck for at least one of the functions of swing and propel, including a horizontal shaft mounted on the rotating base, a pair of gears arranged coaxially of said shaft, one toward each end thereof, gearing for rotating one of said gears in one direction, gearing for rotating the other of said gears in the other direction, and controllable clutches for connecting said gears with said shaft, said clutches being located, respectively, toward opposite ends of said shaft beyond the planes of said gears.

3. In a load handling machine having a rotating base mounted on a crawler truck, a vertical swing shaft, a gear for rotating the swing shaft, said gear being associated with the shaft intermediate its upper and lower ends, driving means associated with the lower end of the swing shaft and cooperating with the crawler truck for effecting swing motion of the rotating base, and a swing brake mounted directly on the upper end of the swing shaft.

4. In a load handling machine having a rotating base mounted on a crawler truck and further having a power plant mounted on the rotating base, drive mechanism for swing and propel including a horizontal shaft mounted on the rotating base, gear transmission means between the power plant and said shaft, a generally upright reverse shaft, gear means connecting said shafts, a controllable clutch for connecting and disconnecting said first shaft with the power plant through said gear transmission means for rotation in one direction, a second controllable clutch for connecting and disconnecting the first shaft with the power plant through said gear transmission means for rotation in the opposite direction, said clutches being mounted on said first shaft outside of said gear means, a swing shaft, a propel shaft, and drive transmission parts for alternatively coupling said reverse shaft with either one of the swing and propel shafts.

5. In a load handling machine having a rotating base mounted on a crawler truck and further having a power plant mounted on the rotating base, drive mechanism for swing and propel including a horizontal shaft mounted on the rotating base, supporting means for said shaft located toward each end thereof, gear transmission means between the power plant and said shaft, a generally upright reverse shaft, gear means connecting said shafts, a controllable clutch for connecting and disconnecting said first shaft with the power plant through said gear transmission means for rotation in one direction, a second controllable clutch for connecting and disconnecting the first shaft with the power plant through said gear transmission means for rotation in the opposite direction, said clutches being mounted on said first shaft outside of the said gear means and the said supporting means, a swing shaft, a propel shaft, and drive transmission parts for alternatively coupling said reverse shaft with either one of the swing and propel shafts.

WILLIAM M. HUSTON.